United States Patent [19]
Fujii et al.

[11] Patent Number: 5,282,920
[45] Date of Patent: Feb. 1, 1994

[54] PROCESS OF AND AN APPARATUS FOR SEALING THERMOPLASTIC RESIN SHEET

[75] Inventors: Atsushi Fujii, Himeji; Kouzaburo Matsuzawa, Tokyo, both of Japan

[73] Assignee: Idemitsu Petrochemical Co., Ltd., Tokyo, Japan

[21] Appl. No.: 911,898

[22] Filed: Jul. 10, 1992

Related U.S. Application Data

[62] Division of Ser. No. 575,129, Aug. 29, 1990, Pat. No. 5,173,413.

[30] Foreign Application Priority Data

Aug. 31, 1989 [JP] Japan .................. 1-227178

[51] Int. Cl.⁵ .................... B30B 15/06; B65B 51/10
[52] U.S. Cl. .................... 156/553; 53/374.2; 53/374.4; 53/559; 156/555; 156/582; 156/583.1
[58] Field of Search .......... 156/472, 471, 470, 581, 156/582, 583.1, 580, 553, 555; 53/477, 454, 453, 559, 560, 374.4, 374.5, 374.2

[56] References Cited

U.S. PATENT DOCUMENTS

| | | | |
|---|---|---|---|
| Re. 20,034 | 7/1936 | Ives | 156/472 |
| 2,362,459 | 11/1944 | Barnett . | |
| 2,376,253 | 5/1945 | Humphrey . | |
| 3,285,800 | 11/1966 | Bartell | 156/209 |
| 3,405,502 | 10/1968 | Badder | 156/582 |
| 3,697,360 | 10/1972 | Chamberlain | 156/578 |
| 3,759,011 | 9/1973 | Akke | 53/560 |
| 3,932,260 | 1/1976 | Balentine . | |
| 4,153,664 | 5/1979 | Sabee | 264/282 |
| 4,455,808 | 6/1984 | Netzhammer | 53/374.2 |
| 4,582,555 | 4/1986 | Bower . | |
| 4,586,317 | 5/1986 | Bussell | 53/451 |
| 4,614,076 | 9/1986 | Rathemacher . | |
| 4,701,235 | 10/1987 | Mitsam | 156/582 |

FOREIGN PATENT DOCUMENTS 0643250 4/1937 Fed. Rep. of Germany ...... 156/209
3439680 5/1985 Fed. Rep. of Germany .

Primary Examiner—Michael W. Ball
Assistant Examiner—Daniel J. Stemmer
Attorney, Agent, or Firm—Flynn, Thiel, Boutell and Tanis

[57] ABSTRACT

A process of and an apparatus for sealing a thermoplastic resin sheet to a mount such as an aluminum sheet uses seal members such as seal rollers or seal plates each having notches thereon, the notches on the first seal roller being intersecting to the notches on the second seal member, whereby the mount can be sealed to the sheet in a crosshatched pattern.

12 Claims, 8 Drawing Sheets

PROCESS OF AND AN APPARATUS FOR SEALING THERMOPLASTIC RESIN SHEET

This is a division of Ser. No. 07/575,129, filed Aug. 29, 1990 now U.S. Pat. No. 5,173,143.

BACKGROUND OF THE INVENTION

1. Field of the Invention

The present invention relates to a process of and an apparatus for sealing a thermoplastic resin sheet and is applicable, e.g., to a blister package used for packing foods, daily needs, medicines and the like.

2. Description of the Related Art

The blister package (PTP package), made by a process of providing pockets on a thermoplastic resin sheet so as to correspond with the shape of a packaged article, placing the article therein and subsequently sealing the pockets with a mount such as an aluminum foil, was conceived in Europe and has been used in Japan since the first half decade of the 1960's.

A sealing plate or a sealing roller has been employed through a conventional sealing process for the blister package. When using the sealing plate 61 so as to be shown in FIG. 16, a thermoplastic resin sheet 62 already formed with pockets (not shown) is fed into a seal-receiving plate 63, where a mount 65 such as aluminum foil supplied from a supply roller 64 is sealed to the sheet 62 by a seal plate 61. As shown in FIG. 17, the seal plate 61 has thereon a convex portion 66 in the crosshatched pattern to thereby form a sealing having the crosshatched pattern at a sealing portion between the sheet 62 and the mount 65.

Figure 18:
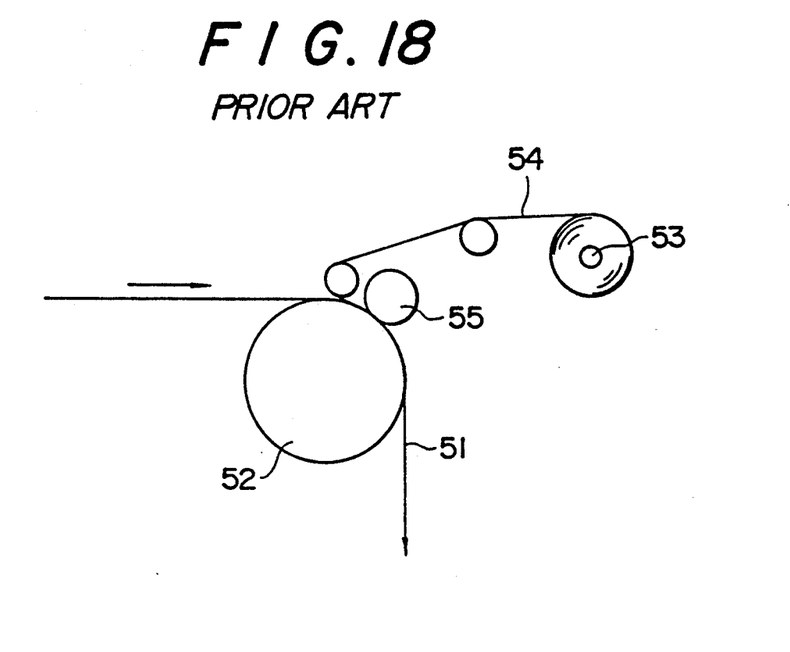
FIG. 18 is a schematic diagram showing another conventional apparatus for sealing with a seal roller.
Figure 19:
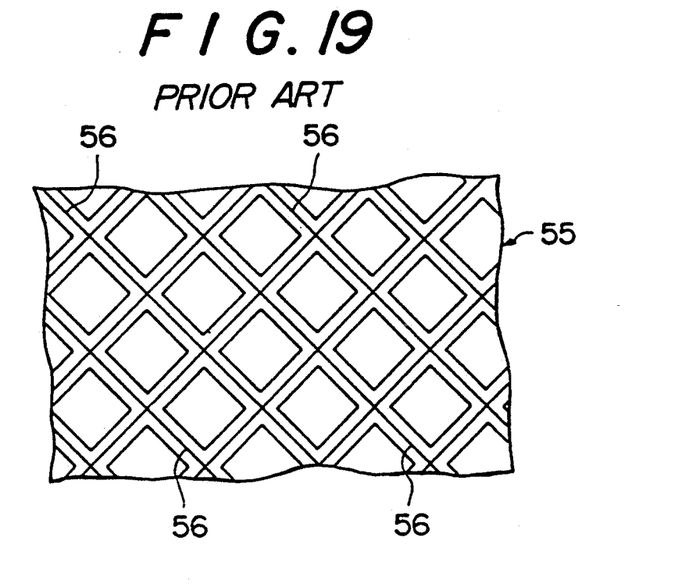
FIG. 19 is a fragmentary development of a seal roller in the conventional apparatus of FIG. 18.

Another conventional sealing process using the seal roller is shown in FIG. 18. A thermoplastic resin sheet 51 already formed with pockets is fed into a seal-receiving roller 52, where a mount 54 supplied from a supply roller 53 is sealed to the sheet 51 by a seal roller 55. As shown in FIG. 19, the sealing roller 55 has thereon a convex portion 56 in the crosshatched pattern to thereby form a sealing having the crosshatched pattern at a sealing portion between the sheet 51 and the mount 54.

However, a large pressure for sealing and a precise surface are inevitable when using the seal plate 61, so that the seal roller has gradually come to be large.

According to the conventional sealing process using the roller 55 as described above, when intending to enlarge an area to be sealed and speed up the process for sealing a material for packaging such as polypropylene (PP) with a mount, some problems come to appear. Some of those are the appearance of the nonuniformity of bite between the mount 54 and the sheet 51 and the deterioration and nonuniformity of sealing strength.

In order to overcome the above problems, some changes were tried, including:

(1) the sealing temperature is raised;
(2) the sealing pressure is increased;
(3) the crosshatched pattern of the convex portion 56 is modified; and
(4) the seal base film (Aluminum foil sealant) is modified to attain fine sealing.

However, there resulted a fuming, a burning and a deformation of an article to be packaged because of trying (1). By trying (2) and (3), some cracks of the aluminum foil appeared by pinholes. When trying (4), the visible bite appearance is not in fine condition, while the sealing temperature of polypropylene can be approximately decreased to 180° C.

An object of the present invention is to provide a process of and an apparatus for sealing a thermoplastic resin sheet under a low temperature and a high speed in operation.

SUMMARY OF THE INVENTION

According to the present invention, a process of sealing a thermoplastic resin sheet having pockets to a mount by means of seal members includes the steps of: sealing the thermoplastic resin sheet with a first seal member provided with at least one notch portion including a plurality of parallel notches and; sealing the thermoplastic resin sheet with a second seal member provided with a notch portion including notches which are intersecting to the notches on the first seal member. Each sealing with the first or second seal member can be respectively performed more than one time, whereby the mount is sealed to the thermoplastic resin sheet in a crosshatched pattern.

According to the present invention, an apparatus for sealing a thermoplastic resin sheet having pockets to a mount by means of seal members includes a first seal member provided with a notch portion including a plurality of parallel notches; and a second seal member provided with a notch portion including notches which are intersecting to the notches on the first seal member, whereby the mount is sealed to the thermoplastic resin sheet in a crosshatched pattern.

A seal roller or a seal plate is selectively adapted as the first and second seal member.

When using the seal roller as the seal member, it is preferable that the first seal roller has at least two notch portions each including parallel notches which are symmetrical to the notches on an adjacent notch portion, and the second seal roller has notch portions equal in number to the notch portions provided on the first seal roller, the notch portions on the second roller including notches which are symmetrical to the notches on the first seal roller. The reason why the notches on adjacent notch portions of a seal roller are arranged not only to intersect but to be symmetrical to each other, is to equalize forces causing a thermoplastic resin sheet to be urged transversely, so that the mount moves straight. In this connection, the number of the notch portions may be more than two. The intersecting angle between the notches on one notch portion and the notches on another adjoining notch portion in a seal roller is not always a right angle, but can be an acute angle or an obtuse angle.

The notch on the first seal roller may be a single notch in the form of a spiral, and the notch on the second seal roller also may be a single spiral notch symmetrical to the single notch on the first seal roller.

Otherwise, when using the seal plate as the seal member, it is preferable that the first seal plate has at least two notch portions each including the parallel notches which are intersecting to the notches on the adjacent notch portion, and that the second seal plate has notch portions equal in number to the notch portions provided on the first seal plate, the notch portions on the second plate including notches which are intersecting to the notches on the first seal plate.

In this case, because the thermoplastic resin sheet is not urged in the direction perpendicular to its moving direction, the relationships in the direction of and number of notches and the number of notch portions on the first and second seal plates can be modified intentionally so that the mount is sealed to the thermoplastic resin sheet in a crosshatched pattern.

A thin film can be used as a material for sealing in the present invention.

DETAILED DESCRIPTION OF THE PREFERRED EMBODIMENT

The preferred first and second embodiments of a process of and an apparatus for sealing a thermoplastic resin sheet having pockets in the present invention will be described in due course with reference to some Figures.

FIRST EMBODIMENT

A sealing apparatus, shown in FIGS. 1 to 8, consists of a seal-receiving roller 11, first and second seal rollers 12, 13 each disposed so as to abut to the peripheral surface of the seal-receiving roller 11, and a supply roller 16 for supplying a mount 15 such as aluminum foil to the seal-receiving roller 11 through two guide rollers 14. The first and second seal rollers 12, 13 are adjacently disposed.

Figure 1:
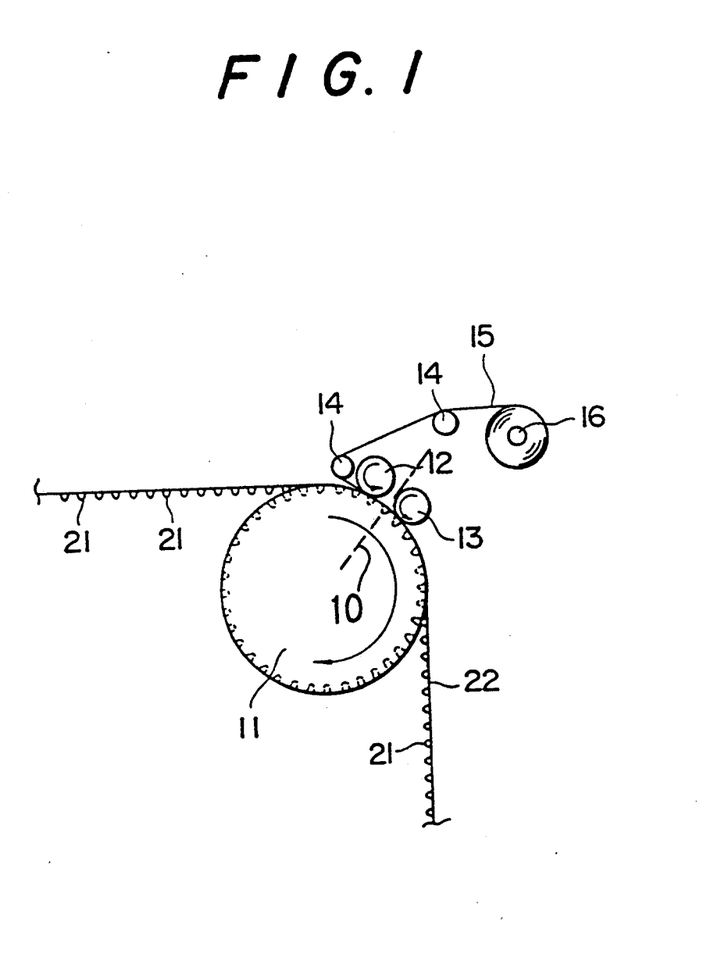
FIG. 1 is a schematic diagram of an apparatus for sealing which is used in a first embodiment of the present invention and has the first and second seal rollers.
Figure 2:
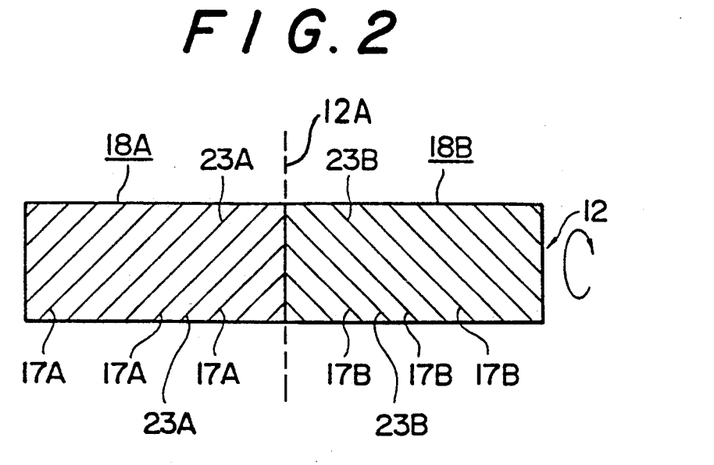
FIG. 2 is a front view of the first seal roller.
Figure 3:
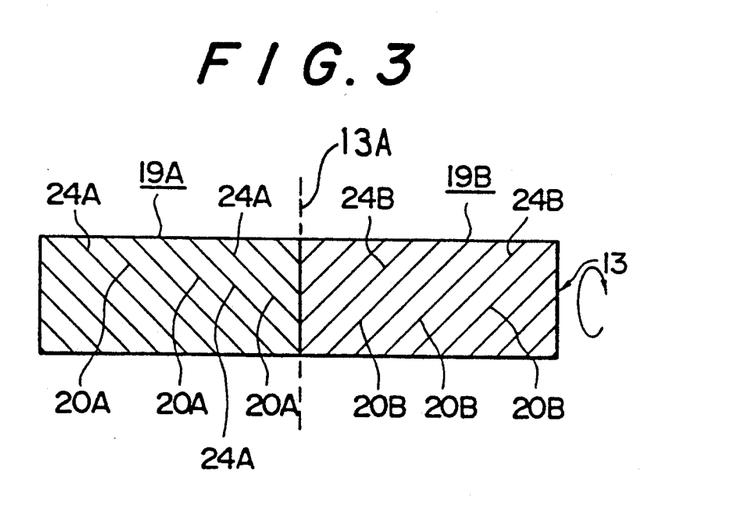
FIG. 3 is a front view of the second seal roller.

The first seal roller 12 shown in FIG. 2 has two notch portions 18A, 18B each including thereon angled parallel notches or grooves 17A, 17B which are symmetrical about a central radial plane 12A located between the portions 18A and 18B of the first seal roller 12. The second seal roller 13 shown in FIG. 3 has notch portions 19A, 19B which are the same in number as the notch portions 18A, 18B on the first seal roller 12. Notches 20A, 20B of the notch portions 19A, 19B have symmetry about a plane 13A, similar to the corresponding notches 17A, 17B of the notch portions 18A, 18B in the first seal roller 12. Further, the roller 12 is symmetrical to the roller 13 about a plane 10 (FIG. 1) disposed between them, the plane 10 being perpendicular to a line extending between the axes of rollers 12 and 13.

Figure 4:
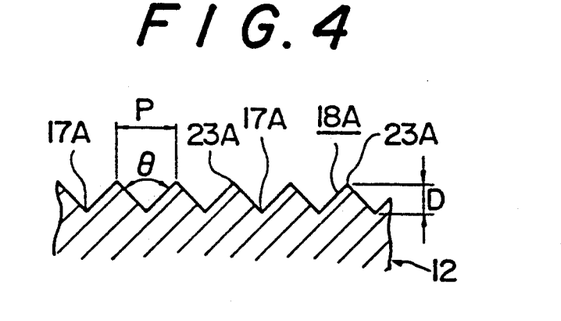
FIG. 4 is a fragmentary sectional view of the first seal roller.
Figure 5:
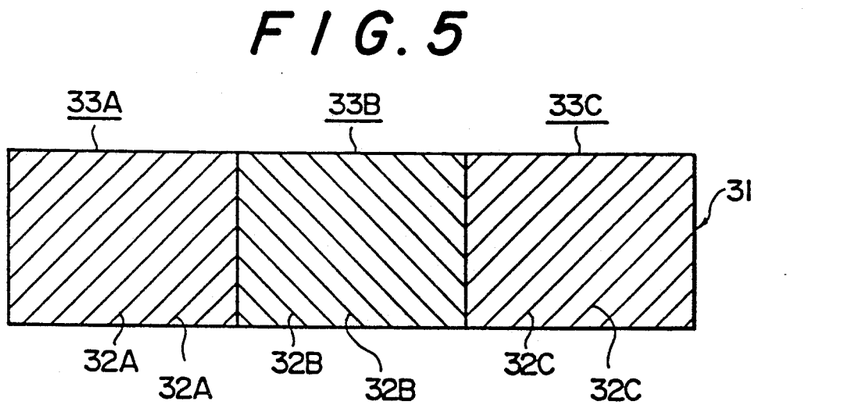
FIGS. 5 to 8 are front views of modified first and second seal rollers.
Figure 6:
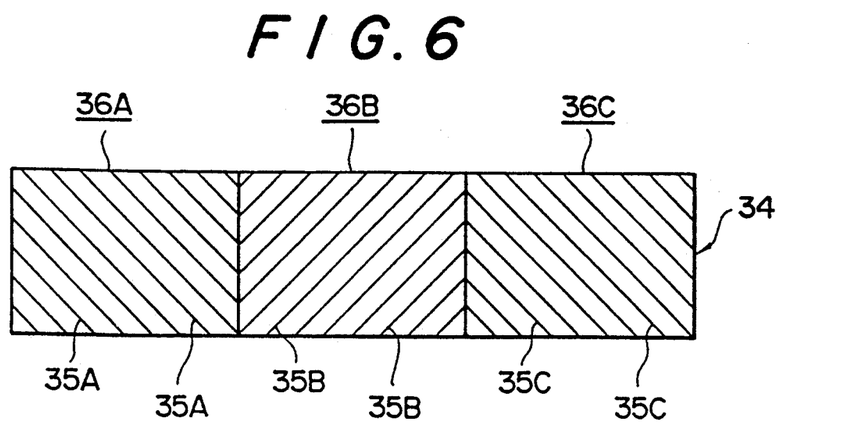

As shown in FIG. 4, the notches 17A which are provided in the notch portion 18A of the first seal roller 12 are constructed to have an interval or pitch P of 0.8 mm, an angle O of 90°, and a depth D of 0.4 mm. The notch portions 19A, 19B of the second seal roller 13 have same structure as that of the notch portions 18A, 18B of the first seal roller 12. The preferred ranges for these parameters are an interval of 0.5 to 1.2 mm, an angle of 60° to 120°, and a depth of 0.4 to 0.8 mm.

A boundary between the notch portions 18A and 18B of the first seal roller or between the notch portions 19A and 19B of the second seal roller is formed at the middle portion between the pockets so as not to be placed over the pockets, whereby a stable state of sealing can be achieved.

The mount 15 is sealed to the thermoplastic resin sheet 22, as to be shown in the following, by using the above described sealing apparatus.

The thermoplastic resin sheet 22 provided thereon with the pockets 21 by a conventional and not-illustrated forming drum is fed into the seal-receiving roller 11 and sealed with the mount 15, which is made from aluminum and supplied from the supplying roller 16, by the first seal roller 12. This sealing operation is performed under the condition of a temperature from 160° to 190° C., a sealing pressure from 3 to 7 kg/cm. and a sealing speed from 5 to 12 m/min. According to the process mentioned above, peaks 23A, 23B between the notches 17A, 17B make obliquely parallel sealing lines on the surface of the mount 15 sealed with the sheet 22.

The thus-processed thermoplastic resin sheet 22 is subsequently sealed by the second seal roller 13. The condition for this operation is the same as that of the first seal roller 12. Other obliquely inclined and parallel sealing lines are formed on the surface of the mount 15 by peaks 24A, 24B between notches 20A and 20B, which lines perpendicularly intersect with the obliquely parallel sealing lines preformed by the first seal roller 12. In consequence, the same crosshatched pattern sealing can be attained with the sealing lines formed by the first seal roller 12 and the sealing lines formed by the second seal roller 13 as with the conventional seal roller shown in FIGS. 18 and 19.

OPERATIVE EXAMPLES 1-3

The inventors have operated the first embodiment under a certain sealing width, sealing temperature, sealing pressure, and sealing speed as shown at operative examples 1 to 3 in Table-1 and produced the thermoplastic resin sheet sealed with a mount, containing articles in pockets. In these examples, the following materials are used as the thermoplastic resin sheet 22 and aluminum of the mount 15 and the like.

Thermoplastic resin sheet . . . IDEMITSU PURELAY MG-400 (Trademark, Produced by Idemitsu Petrochemical Co., Ltd., High-transparent non-oriented polypropylene sheet, 0.25 mm thickness)

Aluminum foil . . . Aluminum for cast-polypropylene sheet (Produced by Nihon Seihaku Co., Ltd., Aluminum foil formed with polypropylene base film, 20 m thickness)

Forming machine for pockets . . . IDEMITSU MD-550 (Trademark, Drum type vacuum forming machine with remedy device disclosed in Japanese Patent Publication No. 58-3892)

Packages . . . Blister packages for third-sized capsule size)

Summary of measurements and evaluations on packages about a sealing condition of the mount 15 and the sheet 22 (Bite appearance, Nonuniformity of bite, Sealing strength, and Nonuniformity of strength), Pinholes, and Curling condition are shown in Table-1 according to respective operative examples.

In the table, the bite appearance of the sealing condition is evaluated by the eye.

The evaluation of pinholes is performed by lighting the packages from its opposite side and evaluating the ray passed through by the eye.

The curling condition is measured in such a manner of detecting a warp at each end portion having a distance of 50 mm in the moving direction of the one-unit package of the sheet 22 which was sealed 24-hours before, adding both detected warps, and then dividing by 2.

CONTROL EXAMPLES 1-5

Table-1 shows a sealing width, a sealing temperature, a sealing pressure, and a sealing speed of the blister packages according to the control examples 1 to 5 in which a single seal roller 55 provided thereon with the convex portion 56 in the crosshatched pattern is employed as shown in FIGS. 18, 19. A distance, depth and the like of the convex portion 56 in the seal roller 55 are constructed like those of the notches 17A, 17B, 20A, 20B. The thermoplastic resin sheet and the mount of aluminum foil are also the same as the ones employed in the above operative examples.

Summary of measurements and evaluations on packages about a sealing condition of the mount and the sheet (Bite appearance, Nonuniformity of bite, Sealing strength, and Nonuniformity of strength), Pinholes, and Curling condition are shown in Table-1 according to respective control examples.

ter packages with less curling and no pinholes can be produced.

According to control example 1, since the conventional seal roller 45 is used under the same process condition as the operative example 1, the bite condition of the mount toward the sheet is poor, and the sealing strength is low.

According to control example 2, in spite of a higher sealing temperature than that in the control example 1, the nonuniformity of the bite appears, and the sealing strength and the curling condition become worse.

According to control example 3, the properties of the whole sealing condition become worse and the curling condition becomes poor because of the wider sealing width than that in the control example 2.

According to control example 4, the properties of the whole sealing condition become poor, some pinholes are found, and the curling condition is also poor in spite of higher sealing pressure than that in the control example 3.

According to control example 5, because the sealing width is more narrow and the sealing speed is faster than those in the control example 4, the sealing condition and the curling condition become poor and some pinholes can be found.

The number of the notch portions 18A, 18B, 20A, 20B on the first and second seal rollers 12, 13 are further changeable upon some necessities. Taking for another embodiment the seal roller with reference to FIGS. 5 and 6, there are three notch portions 33A, 33B, 33C for a first seal roller 31, in which the direction of notches 32A and 32B and the notches 32B and 32C are symmetrical to one another about respective radial planes, while there are three notch portions 36A, 36B, 36C for a second seal roller 34, in which the direction of notches 35A, 35B, 35C are respectively symmetrical to the

TABLE 1

|  |  | Sealing width (mm) | Sealing temperature (°C.) | Sealing pressure (kg/cm) | Sealing speed (m/min) | Sealing condition | | | | Pinholes | Curling condition (mm) |
|---|---|---|---|---|---|---|---|---|---|---|---|
|  |  |  |  |  |  | Bite appearance | Nonuniformity of bite | Strength (g/15 mm) | Nonuniformity of strength |  |  |
| Operative example | 1 | 180 | 170 | 4.5 | 5.5 | Fine | None | 800 | None | None | 0~1 |
|  | 2 | 345 | 170 | 4.5 | 5.5 | Fine | None | 800 | None | None | 0~1 |
|  | 3 | 180 | 170 | 4.5 | 10.0 | Fine | None | 800 | None | None | 0~1 |
| Control example | 1 | 180 | 170 | 4.5 | 5.5 | Poor | None | 300 | None | None | 1~2 |
|  | 2 | 180 | 220 | 4.5 | 5.5 | Fine | Present | 500~650 | Present | None | 3~5 |
|  | 3 | 345 | 220 | 4.5 | 5.5 | Poor | Present | 450~500 | Present | None | 4~5 |
|  | 4 | 345 | 220 | 8.5 | 5.5 | Poor | Present | 600~700 | Present | Present | 4~5 |
|  | 5 | 180 | 220 | 8.5 | 10.0 | Poor | Present | 500~600 | Present | Present | 3~5 |

In operative example 1, the obtained packages are fine in bite appearance, nonuniformity of bite, sealing strength, and nonuniformity of strength in spite of the low sealing temperature and the sealing pressure. There appear to be no pinholes, and little warp after 24 hours from the sealing operation.

In operative example 2, the sealing width becomes larger than that in the operative example 1. It is recognized that the sealing condition and the curling condition are fine and there are no pinholes.

In operative example 3, the sealing speed is higher than that in the operative example 1. It is recognized that the sealing condition and the curling condition are fine and there are no pinholes.

Hence, in accordance with the invention, the sealing width is expanded, the sealing temperature is lowered, the sealing speed is raised, and the sealing pressure is reduced through the sealing process, whereby the blisnotches 32A, 32B, 32C about a plane disposed intermediate the rollers 31 and 34.

The notch on the first seal roller may be a single notch in the form of a spiral instead of a plurality of the notch portions as described in the mentioned embodiment, while a single spiral notch on the second seal roller is symmetrical to the single notch on said first seal roller about the plane 10 between the rollers. In this construction, however, it may be necessary to provide a proper arrangement to prevent meandering of the sheets being sealed, so that the above described embodiments are preferable to use for sealing a thermoplastic resin sheet with a mount.

Figure 7:
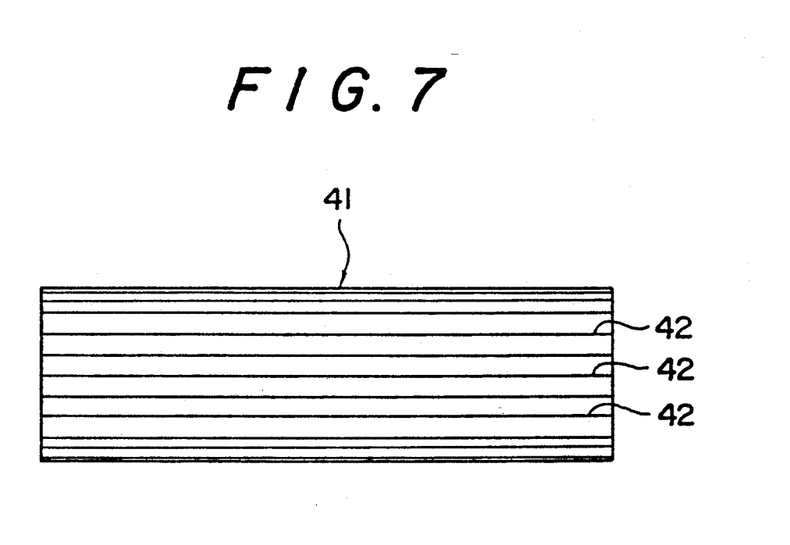
Figure 8:
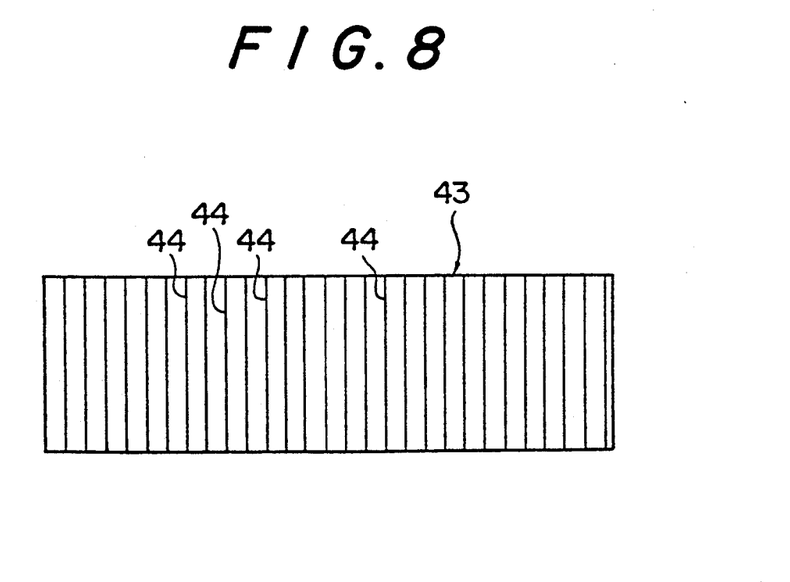

FIGS. 7 and 8 show still another embodiment of the seal rollers, in which a first seal roller 41 is formed with a plurality of notches 42 each parallel to the axial direction thereof and a second seal roller 43 is formed with a plurality of circumferential notches 44 each perpendicularly intersecting the axial direction thereof. In this construction, it is naturally available to shift the positions of the first seal roller 41 and the second seal roller 43 so as to change their order.

In accordance with the first embodiment in the present invention, even under a low sealing temperature and a high-speed sealing, fine blister packages can be produced while keeping the fine sealing condition.

SECOND EMBODIMENT

The preferred second embodiment of a process of and an apparatus for sealing a thermoplastic resin sheet having pockets in the present invention will be described with reference to FIGS. 9 to 15. In the following, a description for a structure which is the same as or similar to that of the aforementioned first embodiment will be abbreviated or made simple.

Figure 9:
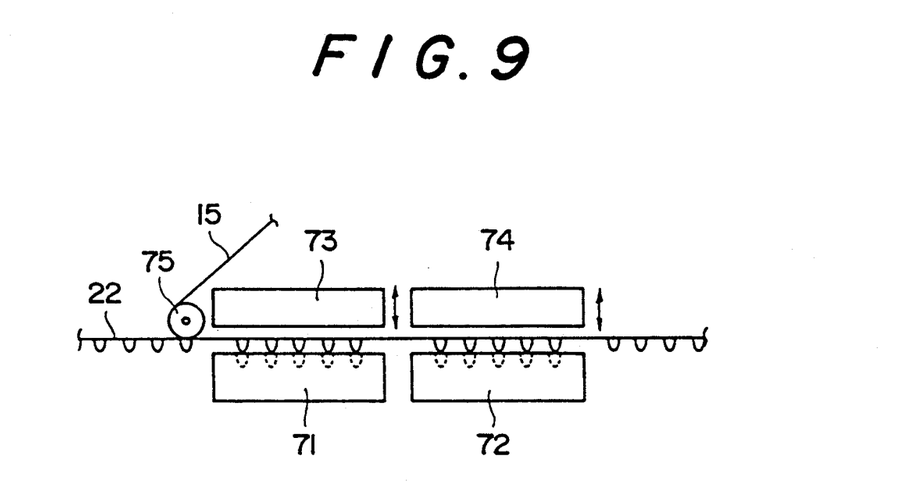
FIG. 9 is a schematic diagram of an apparatus for sealing which is used in a second embodiment of the present invention and has first and second seal plates.

The sealing apparatus in the second embodiment includes first and second seal-receiving plates 71, 72 which are closely disposed to each other along a moving direction of a thermoplastic resin sheet 22, reciprocating-type seal plates 73, 74 respectively corresponding to and disposed above each of the first and second seal-receiving plates 71, 72, and a roller 75 which is disposed right before the first seal plate 73 for smoothly applying to sheet 22 a supplied mount 15. The roller 75 has thereon two notch portions each including angled parallel notches or grooves which are symmetrical to a central radial plane (not shown) located between the two notch portions similar to that shown in FIG. 2.

Figure 10:
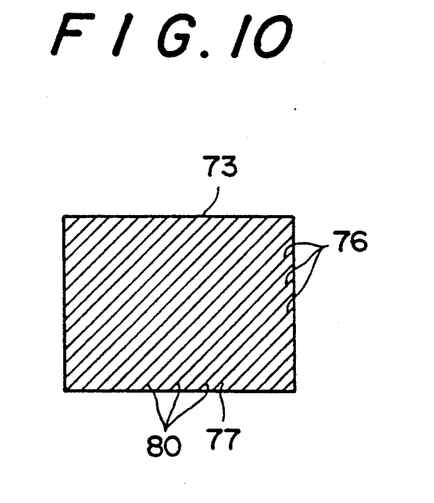
FIG. 10 is a bottom view of the first seal plate in the second embodiment.
Figure 11:
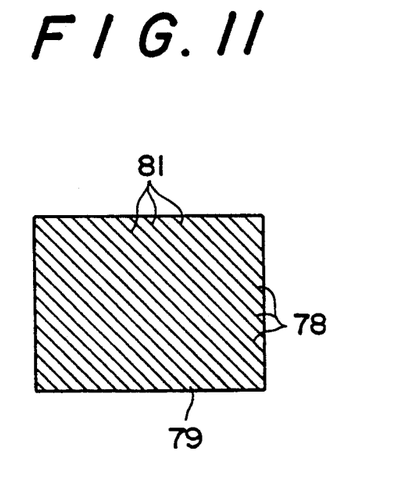
FIG. 11 is a bottom view of the second seal plate in the second embodiment.

FIG. 10 shows the bottom view of the first seal plate 73, on which a notch portion 77 is provided with angled parallel notches 76 in the form of a quadrangle. The second seal plate 74 shown in FIG. 11 has on its bottom surface a notch portion 79 in the form of a quadrangle, which includes angled parallel notches 78 parallel to the notches 76 of the first seal plate 73. The notches 76, 78 in notch portions 77, 79 of the first and second seal plate 73, 74 have intervals of 0.8 mm, angles of 90° and depths of 0.4 mm.

The mount 15 is sealed to the thermoplastic resin sheet 22 by using the aforementioned sealing apparatus as follows.

First of all, the thermoplastic resin sheet 22 having thereon pockets 21 is fed into the seal-receiving plate 71, 72. The fed sheet 22 is sealed to the mount 15, which is supplied from a supply roller and applied to sheet 22 by the roller 75, by a downward movement of the first seal plate 73. This sealing can be performed under the condition of sealing temperature 150° to 190° C., sealing pressure of at least 3 Kg/cm², and sealing time above 0.1 second. In this case, angled linear sealing lines parallel to each other are formed on the surface of the mount 15 by a convex portion 80 between the notches 76.

The sheet 22 is further sealed to the mount 15 by a downward movement of the second seal plate 74. This sealing condition is the same as that of the first seal plate 73. In this case, angled linear sealing lines parallel to each other are formed on the surface of the mount 15 so as to perpendicularly intersect the angled linear sealing lines formed by the first seal plate. Accordingly, the same sealing having the crosshatched pattern can be obtained as that by the conventional single seal plate.

OPERATIVE EXAMPLES 4-6

The inventors have operated the second embodiment under a certain sealing width, sealing temperature, sealing pressure, and sealing speed as shown at operative examples 4 to 6 in Table-2 and produced the thermoplastic resin sheet sealed with a mount, containing articles in pockets. In these examples, the same materials are used as in the first embodiment for the thermoplastic resin sheet 22 and aluminum of the mount 15 and the like.

Summary of measurements and evaluations on packages about a sealing condition of the mount 15 and the sheet 22 (Bite appearance, Nonuniformity of bite, Sealing strength, and Nonuniformity of strength), Pinholes, and Curling condition are shown in Table-2 as in Table-1 according to respective operative examples.

CONTROL EXAMPLES 6-10

Figure 16:
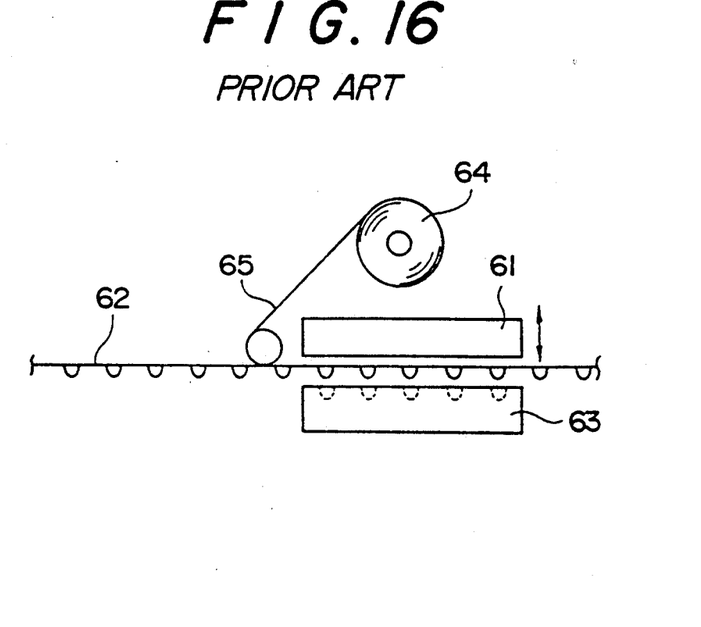
FIG. 16 is a schematic diagram showing one conventional apparatus for sealing with a seal plate.
Figure 17:
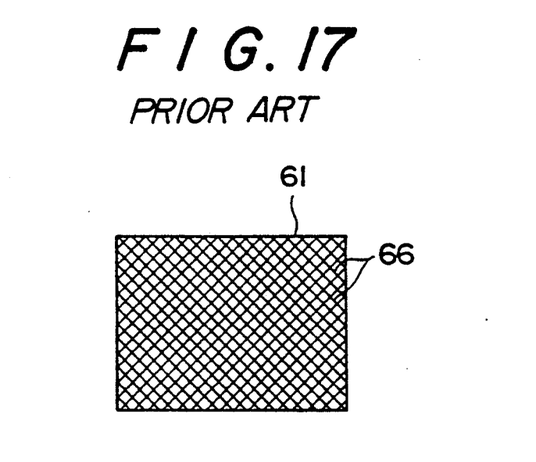
FIG. 17 is a fragmentary development of a seal plate in the conventional apparatus.

Table-2 shows a sealing width, a sealing temperature, a sealing pressure, and a sealing speed of the blister packages according to the control examples 6 to 10 in which a single seal plate 61 provided thereon with the convex portion 66 in the crosshatched pattern is employed as shown in FIGS. 16, 17. A distance, depth and the like of the convex portion 66 in the seal plate 61 are constructed like those of the notches 76, 78. The thermoplastic resin sheet and the mount of aluminum foil are also the same as the ones employed in the above operative examples.

Summary of measurements and evaluations on packages about a sealing condition of the mount and the sheet (Bite appearance, Nonuniformity of bite, Sealing strength, and Nonuniformity of strength), Pinholes, and Curling condition are shown in Table-2 according to respective control examples.

TABLE 2

| | | Sealing width (mm) | Sealing temperature (°C.) | Sealing pressure (kg/cm²) | Sealing Time (Sec) | Bite appearance | Nonuniformity of bite | Strength (g/15 mm) | Nonuniformity of strength | Pinholes | Curling condition (mm) |
|---|---|---|---|---|---|---|---|---|---|---|---|
| Operative example | 4 | 180 | 160 | 8 | 0.5 | Fine | None | 800 | None | None | 0~1 |
| | 5 | 345 | 160 | 8 | 0.5 | Fine | None | 750 | None | None | 0~1 |
| | 6 | 180 | 160 | 8 | 1.0 | Fine | None | 1000 | None | None | 0~1 |
| Control example | 6 | 180 | 160 | 8 | 0.5 | Poor | None | 600 | None | None | 8~10 |
| | 7 | 180 | 200 | 8 | 0.5 | Poor | None | 750 | None | None | 8~10 |
| | 8 | 345 | 200 | 8 | 0.5 | Poor | None | 650 | None | None | 8~10 |
| | 9 | 345 | 200 | 10 | 0.5 | Poor | None | 700 | None | Present | 5~8 |
| | 10 | 180 | 200 | 10 | 1.0 | Poor | None | 700 | None | Present | 2~3 |

In operative example 4, the obtained packages are fine in bite appearance, nonuniformity of bite, sealing strength, and non-uniformity of strength in spite of the low sealing temperature and the sealing pressure. There appear to be no pinholes, and little warp after 24 hours from the sealing operation.

In operative example 5, the sealing width becomes larger than that in the operative example 4. It is recognized that the sealing condition and the curling condition are fine and there are no pinholes.

In operative example 6, the sealing speed is higher than that in the operative example 4. It is recognized that the sealing condition and the curling condition are fine and there are no pinholes.

Hence, in accordance with the invention, the sealing width is expanded, the sealing temperature is lowered, the sealing time is shortened, and the sealing pressure is reduced through the sealing process, whereby the blister packages with less curling and no pinholes can be produced.

According to control example 6, since the conventional seal plate 61 is used under the same process condition as the operative example 4, the bite condition of the mount toward the sheet is poor, and the sealing strength is low.

According to control example 7, in spite of a higher sealing temperature than that in the control example 6, the nonuniformity of the bite appears, and the sealing strength and the curling condition become worse.

According to control example 8, the properties of the whole sealing condition become worse and the curling condition becomes poor because of the wider sealing width than that in the control example 7.

According to control example 9, the properties of the whole sealing condition become poor, some pinholes are found, and the curling condition is also poor in spite of higher sealing pressure than that in the control example 8.

According to control example 10, because the sealing width is more narrow and the sealing time is longer than those in the control example 9, the sealing condition and the curling condition become poor and some pinholes can be found.

Figure 12:
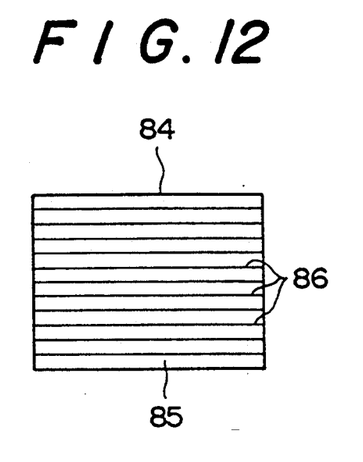
FIGS. 12 to 15 are bottom views of modified first and second seal plates.
Figure 13:
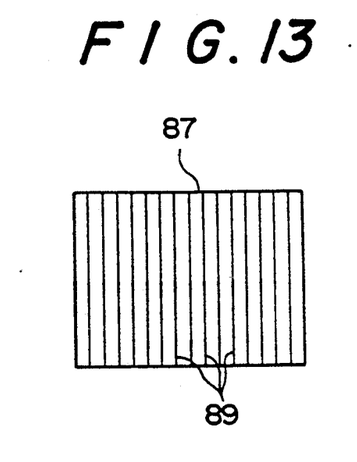

In the second embodiment, the first and second seal plates 73, 74 are arranged to have on their bottom surface the notch portions 77, 79 including parallel notches 76, 78. However, a first seal plate 84 may have a notch portion 85 including notches 86 along with the moving direction of the sheet 22 and a second seal plate 87 also may comprise notches 89 perpendicular to the notches 84 of the first seal plate 84.

Figure 14:
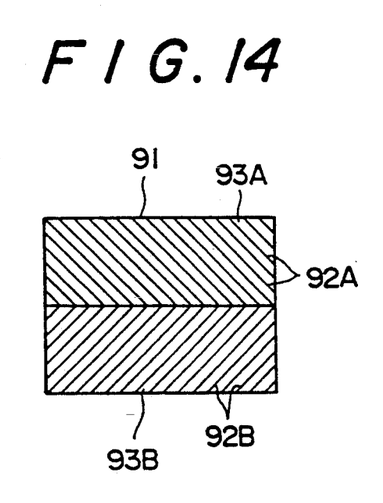
Figure 15:
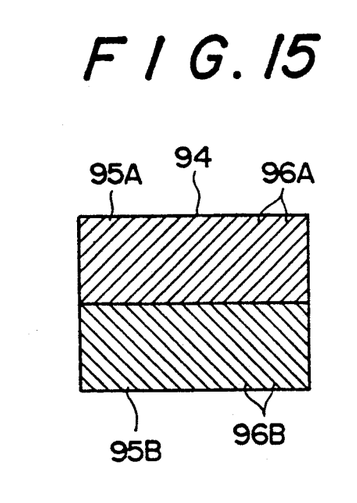

The first and second seal plates may be further arranged as shown in FIGS. 14 and 15. A first seal plate 91 has two notch portions 93A, 93B respectively including angled notches 92A, 92B which are symmetrical about the moving direction of the sheet, while a second seal plate 94 has the same notch portions 95A, 95B as in the first seal plate 91 in number and angled notches 96A, 96B respectively included in the notch portions 95A, 95B are symmetrical to the corresponding notches 92A, 92B.

In accordance with the second embodiment in the present invention, even under a low sealing temperature and a high-speed sealing, fine blister packages can be produced while keeping the fine sealing condition as by the first embodiment.

What is claimed is:

1. In an apparatus which includes sealing means for sealing a thermoplastic resin sheet having pockets to a mount, wherein the improvement comprises said sealing means including first and second seal members which successively seal said thermoplastic resin sheet to said mount, said first seal member having first and second notch portions each including a plurality of parallel notches, said notches of said first notch portion extending at an angle less than 180° with respect to said notches of said second notch portion, and said second seal member having third and fourth notch portions each including a plurality of parallel notches, said notches of said third notch portion extending at an angle less than 180° with respect to said notches of said fourth notch portion, said first and second seal members being oriented with respect to each other so that said notches of said third notch portion produce seal lines on said mount and resin sheet which intersect seal lines produced thereon by said notches of said first notch portion to yield a crosshatched pattern, and so that said notches of said fourth notch portion produce seal lines on said mount and resin sheet which intersect seal lines produced thereon by said notches of said second notch portion to yield a crosshatched pattern.

2. The apparatus according to claim 1, wherein said first seal member is a first roller supported for rotation about a first axis, said first and second notch portions being located on respective sides of a radial plane perpendicular to said first axis, and said second seal member is a second roller supported for rotation about a second axis, said third and fourth notch portions being located on respective sides of a second radial plane perpendicular to said second axis, said notches of said first and second notch portions each intersecting said first plane at a common predetermined angle, and said notches of said third and fourth notch portions each intersecting said second plane at a common predetermined angle.

3. The apparatus according to claim 2, wherein said notches of said first and second notch portions are oriented so that each said notch of said first notch portion intersects a respective notch of said second notch portion at said first plane in a manner so that said first and second notch portions are mirror images of each other about said first plane, and said notches of said third and fourth notch portions are oriented so that each said notch of said third notch portion intersects a respective notch of said fourth notch portion at said second plane in a manner so that said third and fourth notch portions are symmetric about said second plane.

4. The apparatus according to claim 2, wherein said sealing means includes means for producing a sealing temperature from 160° to 190° C. In the region of each of said first and second seal members, means for causing each of said first and second seal members to effect sealing with a sealing pressure (line pressure) from 3 to 7 kg/cm, and means for causing said thermoplastic resin sheet and said mount to move past said first and second seal members at a sealing speed in the range of 5 to 12 m/min.

5. The apparatus according to claim 2, wherein said notch portions on said first seal roller each have thereon a single notch in the form of a spiral, and said notch portions on said second seal roller each have thereon a single notch in the form of a spiral.

6. The apparatus according to claim 1, wherein each of said first and second seal members is a respective seal plate, said sealing means including means for successively moving said first and second seal plates into contact with a portion of said resin sheet and mount.

7. The apparatus according to claim 6, including means for producing a sealing temperature from 150° to 190° C. in the region of each of said first and second seal members, and means for causing each of said first and second seal members to effect sealing with a sealing pressure (surface pressure) greater than 3 kg/cm$^2$ and a sealing time greater than 0.1 second.

8. The apparatus according to claim 1, wherein the seal lines produced on said mount and resin sheet by said first seal member intersect the seal lines produced thereon by said second seal member at a right angle.

9. The apparatus according to claim 1, wherein the notches on said first and second seal members have intervals from 0.5 to 1.2 mm, angles from 60° to 120°, and depths from 0.4 to 0.8 mm.

10. The apparatus according to claim 1, wherein said sealing means includes a first seal-receiving portion having thereon a surface which is engageable with said resin sheet and which has therein a plurality of recesses for receiving respective said pockets on said resin sheet, and a second seal-receiving portion having thereon a surface which is engageable with said resin sheet and which has therein a plurality of recesses for receiving respective said pockets of said resin sheet, said mount and said resin sheet being disposed between and being pressed by said first seal member against said first seal-receiving portion during sealing by said first seal member, and said mount and said resin sheet being disposed between and being pressed by said second seal member against said second seal-receiving portion during sealing by said second seal member.

11. The apparatus according to claim 10, wherein said sealing means includes a rotatably supported seal-receiving roller having a substantially cylindrical external surface with a plurality of recesses therein, said first and second seal-receiving portions being respective portions of said seal-receiving roller.

12. The apparatus according to claim 10, including first and second spaced seal-receiving plates, said first and second seal-receiving portions each being a respective one of said seal-receiving plates.

* * * * *

UNITED STATES PATENT AND TRADEMARK OFFICE
CERTIFICATE OF CORRECTION

PATENT NO. : 5 282 920

DATED : February 1, 1994

INVENTOR(S) : Atsushi FUJII et al

It is certified that error appears in the above-identified patent and that said Letters Patent is hereby corrected as shown below:

Column 10, line 44; change "In" to ---in---.

Column 12, line 16; after "a" insert
---portion of a---.

Signed and Sealed this

Fifth Day of July, 1994

Attest:

BRUCE LEHMAN

Attesting Officer    Commissioner of Patents and Trademarks